United States Patent
Polanyi et al.

(10) Patent No.: US 7,305,336 B2
(45) Date of Patent: Dec. 4, 2007

(54) SYSTEM AND METHOD FOR SUMMARIZATION COMBINING NATURAL LANGUAGE GENERATION WITH STRUCTURAL ANALYSIS

(75) Inventors: Livia Polanyi, Palo Alto, CA (US); Martin H. van den Berg, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 700 days.

(21) Appl. No.: 10/231,732

(22) Filed: Aug. 30, 2002

(65) Prior Publication Data
US 2004/0044519 A1    Mar. 4, 2004

(51) Int. Cl.
G06F 17/27    (2006.01)

(52) U.S. Cl. .................................. 704/9; 704/1

(58) Field of Classification Search ............ 704/9, 704/1
See application file for complete search history.

(56) References Cited

U.S. PATENT DOCUMENTS

| | | | |
|---|---|---|---|
| 5,870,709 A | | 2/1999 | Bernstein |
| 6,112,168 A | * | 8/2000 | Corston et al. ............. 704/9 |
| 6,161,091 A | | 12/2000 | Akamine |
| 6,205,456 B1 | * | 3/2001 | Nakao ..................... 715/531 |
| 6,224,383 B1 | | 5/2001 | Shannon |
| 6,299,452 B1 | | 10/2001 | Wasowicz |
| 6,324,507 B1 | | 11/2001 | Lewis |
| 6,349,316 B2 | * | 2/2002 | Fein et al. ................. 715/531 |
| 6,389,435 B1 | | 5/2002 | Golovchinsky et al. |
| 6,952,666 B1 | * | 10/2005 | Weise ........................ 704/9 |
| 2002/0046018 A1 | * | 4/2002 | Marcu et al. .............. 704/9 |
| 2002/0083104 A1 | | 6/2002 | Polanyi et al. |
| 2002/0194230 A1 | | 12/2002 | Polanyi et al. |
| 2003/0115080 A1 | * | 6/2003 | Kasravi et al. ............ 705/1 |

OTHER PUBLICATIONS

Mani, Inderjeet et al., "Machine Learning of Generic and User-Focused Summarization", *Proceedings Of The Fifteenth National/Tenth Conference On Artificial Intelligence/Innovative Applications Of Artificial Intelligence Table Of Contents*, pp. 820-826, (1998).

Martin J.R., "English Text: System and Structure," *Benjamins: Philadelphia and Amsterdam*, (1992), pp. 344-348.

Williams, Carl E., *Emotions and Speech: Some Acoustical Correlates*, in The Journal of the Acoustical Society of America, vol. 52, No. 4 (Part 2) 1972, pp. 1238-1250.

Mozziconacci, S.J.L. et al., *Role of Intonation Patterns in Conveying Emotion in Speech*, ICPhS99, San Francisco, pp. 2001-2004, (1999).

Connor, Ulla, *Constrastive Rhetoric Cross-cultural Aspects of Second-Language Writing*, Cambridge University Press, pp. 14-25, 1996.

Nakatani, Christine Hisayo, *The Computation Processing of Intonational Prominence: A Functional Prosody Perspective*, Thesis paper presented by author to Division of Engineering and Applied Science, Harvard University, Cambridge, Massachusetts, 116 pages, May 1997.

(Continued)

*Primary Examiner*—Richemond Dorvil
*Assistant Examiner*—Leonard saint-Cyr
(74) *Attorney, Agent, or Firm*—Fliesler Meyer LLP (57) ABSTRACT

A system and method of summarizing text comprising performing structural summarization of a source text and compressing at least one relationship in the structural summarization.

36 Claims, 8 Drawing Sheets

OTHER PUBLICATIONS

Pierrehumbert, Janet and Julia Hirschberg, *The Meaning of Intonational Contours in the Interpretation of Discourse*, Chapter 14 of Intentions in Communication, Cohen, Philip, et al., editors, 39 pages (1990).

Cauldwell, Richard, "Tones, Attitudinal Meanings, and Context", Speak Out! Newsletter of the IATEFL Pronunciation Special Interest Group, No. 21, Dec. 1997, pp. 30-35.

Skorochodko, E., "Adaptive Method of Automatic Abstracting and Indexing," *In Information Processing*, vol. 2, North-Holland Publishing Company (1971) pp. 1179-1182.

Grefenstette, Gregory, Producing intelligent telegraphic text reduction to provide an audio scanning service for the blind. In *AAAI 98 Spring Symposium on Intelligent Text Summarization*, pp. 111-117, 1998.

Maynard, Senko K. *Principles of Japanese Discourse: A Handbook*, Cambridge University Press, pp. 23-98, 1998.

Longacre, R.E., "An Anatomy of Speech Notions," *The Peter de Ridder Press*, Lisse (1976).

Halliday, M.A., et al., "Text and Context: Aspects of Language in a Social Semiotic Perspective," *Geelong:Vic.: Deakin University Press* (1985).

Polanyi, L., et al., "On the Recursive Structure of Discourse," In: K. Ehrlich and H. van Riemsdijk (eds), *Connectedness in Sentence, Discourse and Text* (1983) Tilburg University, (1983) pp. 141-178.

Appelt, D. et al., *Introduction to Information Extraction Technology*, Artificial Intelligence Center, SRI International, pp. 1-41 (1999).

Bryant, G. et al., *Recognizing Verbal Irony in Spontaneous Speech*, Lawrence Erlbaum Associates, Inc., University of California, Santa Cruz, Metaphor and Symbol, 17(2), pp. 99-117, 2002.

Cauldwell. *Where did the Anger go? The Role of Context in Interpreting Emotion in Speech*, The University of Buckingham, EISU, Department of English, The University of Birmingham, 5 pages.

Corston-Oliver, S., *Text Compacting for Display on Very Small Screens*, in North American Chapter of the Association of Computational Linguist (NAACL) 2001 Language Technologies Workshops, Jun. 3-4, 2001.

Hovy, Eduard et al., "Automated text Summarization in SUMMARIST", In Advances in Automatic Text Summarization, 14 pages Aug. 8, 1997.

Lin, C., Knowledge-based Automatic Topic Identification, in *Proceedings of the 33rd Annual Meeting of the Association for Computational Linguistics* (ACL-95) (1995) pp. 308-310.

Marcu, Daniel "The Rhetorical Parsing of Natural Language Texts", in *The Proceedings of the 35th Annual Meeting of the Association for Computational Linguistics*, (ACL'97/EACL'97) pp. 96-103, Madrid, Spain, Jul. 7-10, 1997.

Marshall, C.C., et al., Aquanet: A Hypertext Tool to Hold Your Knowledge in Place,@ *Proceedings of Third ACM Conference on Hypertext Hypertext >91*, San Antonio, Texas (1991) pp. 261-275.

Polanyi, L., et al., A Syntactic Approach to Discourse Semantics, in *Proceedings of the 6th International Conference on Computational Linguistics*, Stanford, California (1984).

Scott, Mike, et al., editors "Patterns of Lexis in Text," *Oxford University Press*, introduction page, (1991).

Tatham, et al., *Modelling Speech Prosodics for Synthesis-Perspectives and Trials*, IEE Seminar, State-Of-The-Art In Speech Synthesis, London, Apr. 2000.

Wichmann, A., *The Attitudinal Effects of Prosody, and How They Relate to Emotion*. Department of Cultural Studies, University of Central Lancashire, Preston PR1 2 HE, UK, 5 pages.

Barzilay, R., et al., "Using Lexical Chains forText Summarization," *In Proceedings of the ACL '97/EACL'97 Workshop on Intelligent Scalable Text Summarization*, (1997) pp. 10-17.

Halliday, M.A.K., et al., "Cohesion in English," London:Longmans (1976).

Hoey, M., "Patterns of Lexis in Text," *Oxford University Press* (1991).

Lin, C., et al., "Identifying Topics by Position," *In Proceedings of the Fifth Conference on Applied Natural Language Processing*, (ANLP-97) (1997) pp. 287-290.

Longacre, R.E., "Discourse Analysis and Literacy," In Gorman, Thomas P. (editor) Language and Literacy, Tehran, Iran, International Association for Adult Literacy Methods (1977) 301, pp. 71-87.

Joyce, M., "Storyspace as a Hypertext System for Writers and Readers of Varying Ability," *Hypertext 91 Proceedings*, ACM, Baltimore (1991) pp. 381-389.

Marcu, D., "Discourse Trees Are Good Indicators of Importance in Text," In I. Mani and M. Maybury editors, *Advances in Automatic Text Summarization*, The MIT Press, (1999) pp. 123-136.

Polanyi, L., et al., "Discourse Structure and Discourse Interpretation," *In Proceedings of the Tenth Amsterdam Colloquium*, ILLC, Amsterdam (1996).

Sparck Jones, K., "What Might Be in a Summary?" *In Information Retrieval 93: Von der Modellierung zur Anwendung*, (1993b) pp. 9-26.

Teufel, S., et al., "Sentence Extraction as a Classification Task," *In Proceedings of the ACL '97/EACL'97 Workshop on Intelligent Scalable Text Summarization* (1997) pp. 58-65.

Stone, M., et al., "Sentence Planning as Description Using Tree Adjoining Grammar," *Department of Computer and Information Science and Department of Linguistics*, University of Pennsylvania, Philadelphia, PA., 8 pages.

Ansari, D., et al., "Generating Warning Instructions by Planning Accidents and Injuries," *Department of Computer Science*, University of Toronto, Toronto, Ontario (1995) 10 pages.

Dalianis, H., "Aggregation as a Subtask of Text and Sentence Planning," *Department of Computer and Systems Sciences*, The Royal Institute of Technology and Stockholm University, 5 pages.

Rambow, O., et al., "Natural Language Generation in Dialog Systems," *AT&T Labs- Research*, Florham Park, NJ, USA, 4 pages.

Mellish, C., et al., "Experiments Using Stochastic Search for Text Planning," *Department of Artificial Intelligence and Human Communication Research Centre*, University of Edinburgh U.K. pp. 1-10.

Kan, M., et al., "Applying Natural Language Generation to Indicative Summarization," *Department of Computer Science and Center for Research on Information Access*, Columbia University, New York, NY, 9 pages.

Prüst, H., et al., "Discourse Grammar and Verb Phrase Anaphora," *Linguistics and Philisophy*, (Aug. 1994) pp. 1-64.

Polanyi, L., "The Linguistic Structure of Discourse," *Institute for Logic, Language and Computation Faculty of Arts*, University of Amsterdam, Spuistraat 134, 1012 VB, Amsterdam, (Nov. 1995) pp. 1-64.

Baxendale, P., "Machine-Made Index for Technical Literature—An Experiment," *IBM Journal of Research and Development*, vol. 2, No. 4, Oct. 1958, pp. 354-361.

Edmundson, H., "New Methods in Automatic Extracting," *Journal of the Association For Computing Machinery*, vol. 16, No. 2, Apr. 1969, pp. 264-285.

Kupiec, J., et al., "A Trainable Document Summarizer," *In Proceedings of the 18th ACM/SIGIR Annual Conference on Research and Development in Information Retrieval*, Seattle, Washington (Jul. 9-13, 1995) pp. 68-73.

Luhn, H., "The Automatic Creation of Literature Abstracts," *IBM Journal of Research and Development* vol. 2, No. 2, Apr. 1958, pp. 159-165.

Mani, I., et al., "Multi-Document Summarization by Graph Search and Matching," *In Proceedings of the Fourteenth National Conference on Artificial Intelligence* (AAAI-97) (1997) pp. 622-628.

Trigg, R., "NoteCards in a Nutshell," *Proc. ACM CHI+GI 87* (Toronto, Apr. 5-9, 1987) pp. 45-52.

Mann, W., et al., "Rhetorical Structure Theory: Toward a Functional Theory of Text Organization," *Text* 8(3) (1988) pp. 243-281.

Polanyi, L, "A Formal Model of the Structure of Discourse," *In: Journal of Pragmatics 12*, (1988) pp. 601-638.

Rush, J., et al., "Automatic Abstracting and Indexing," Production of indicative abstracts by application of contextual inference and syntactic coherence criteria, *Journal of American Society for Information Sciences*, vol. 22, No. 4, Jul.-Aug. 1971, pp. 260-274.

* cited by examiner

Japanese people eat noodles.
Noodles are eaten for lunch or a light snack.
Noodles are served in a hot soup or cold like a salad.
Several kinds of noodles are eaten in Japan.
802 — Udon, Soba and Ramen are kinds of noodles
Noodles are eaten as a variation for the daily meal.

804

Japanese people eat noodles.
Noodles are eaten for lunch or a light snack.
Noodles are served in a hot soup or cold like a salad.
When noodles are served in a hot soup,
vegetables, tofu, and meat are also found within the soup.
Several kinds of noodles are eaten in Japan.
806 — Udon are thick white noodles
made from wheat flour.
Soba are thin buckwheat noodles.
They are firmer than udon.
Ramen are very thin, curly wheat noodles.
Noodles are eaten as a variation for the daily meal.

FIG. 8

SYSTEM AND METHOD FOR SUMMARIZATION COMBINING NATURAL LANGUAGE GENERATION WITH STRUCTURAL ANALYSIS

CROSS REFERENCES

This application is related to the following co-pending applications which are each hereby incorporated by reference in their entirety: SYSTEM AND METHOD FOR DYNAMICALLY DETERMINING THE ATTITUDE OF AN AUTHOR OF A NATURAL LANGUAGE DOCUMENT, U.S. application Ser. No. 10/364,208, Inventors: Livia Polanyi, et al., filed on Feb. 11, 2003; SYSTEM AND METHOD FOR DYNAMICALLY DETERMINING THE FUNCTION OF A LEXICAL ITEM BASED ON CONTEXT, U.S. application Ser. No. 10/364,038, Inventors: Livia Polanyi, et al., filed on Feb. 11, 2003; SYSTEM AND METHOD FOR DYNAMICALLY DETERMINING THE FUNCTION OF A LEXICAL ITEM BASED ON DISCOURSE HIERARCHY STRUCTURE, U.S. application Ser. No. 10/364,191, Inventors: Livia Polany, et al., filed on Feb. 11, 2003; SYSTEMS AND METHODS FOR DYNAMICALLY DETERMINING THE ATTITUDE OF A NATURAL LANGUAGE SPEAKER, U.S. application Ser. No. 10/387,719, Inventors: Livia Polanyi, et al., filed on Mar. 13, 2003; SYSTEM AND METHOD FOR TEACHING WRITING USING MICROANALYSIS OF TEXT; U.S. application Ser. No. 09/609,325. Inventors: Livia Polanyi, et al., filed on Jun. 30, 2000; SYSTEM AND METHOD FOR GENERATING TEXT SUMMARIES, U.S. application Ser. No. 09/689,779 Inventors: Livia Polanyi, et al., filed on Oct. 13, 2000; SYSTEM AND METHOD FOR WRITING ANALYSIS USING THE LINGUISTIC DISCOURSE MODEL, U.S. application Ser. No. 09/630,371. Inventors: Livia Polanyl, et al., filed on Aug. 1, 2000; SYSTEMS AND METHODS FOR DYNAMIC READING FLUENCY PROFICIENCY ASSESSMENT, U.S. application Ser. No. 10/237,135 Inventors: Livia Polanyi. etal., filed on Sep. 9, 2002; SYSTEMS AND METHODS FOR DYNAMIC READING FLUENCY INSTRUCTION AND IMPROVEMENT U.S. application Ser. No. 10/263,834, Inventors: Livia Polanyi, et al., filed on Oct. 4, 2002; SYSTEMS AND METHODS FOR DYNAMIC PERSONALIZED READING INSTRUCTION, U.S. application Ser. No. 09/987,420, Inventors: Livia Polanyi, et al., filed on Nov. 14, 2001; SYSTEM AND METHOD FOR TEACHING SECOND LANGUAGE WRITING SKILLS USING THE LINGUISTIC DISCOURSE MODEL, U.S. application Ser. No. 09/742,449, Inventors: Livia Polanyi, et al., filed on Dec. 22, 2000; SYSTEM AND METHOD FOR GENERATING ANALYTIC SUMMARIES, U.S. application Ser. No. 09/883,345, Inventors: Livia Polanyi, at al., filed on Jun. 19, 2001.

This application is related to the following publications which are each hereby incorporated by reference in their entirety: Livia Polanyi, *The Linguistic Structure of Discourse*, Stanford University: CENTER FOR THE STUDY OF LANGUAGE AND INFORMATION TECHNICAL REPORT, CSLI-96-200 (1996); and Hub Prüst, Remko Scha and Martin H. van den Berg, *Discourse Grammar and Verb Phrase Anaphora*, LINGUISTICS & PHILOSOPHY 17 (1994).

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE DISCLOSURE

The present invention disclosure relates to the field of automatic text summarization and, in particular, hybrid structural analysis.

BACKGROUND

Documents in digital form are pervasive, especially on the World Wide Web where ubiquitous access has made it possible to retrieve vast numbers of documents with only a few key strokes. However, this capability is hindered without the ability to automatically generate accurate and concise text summaries to aid in the selection and categorization of documents. Ubiquitous access also implies that documents are viewed on many kinds of devices (e.g., mobile computers, personal digital assistants, hand-held computers, wrist computers, cellular telephones, etc.) having a variety of display formats from large to very small. Documents that are easily viewed on large displays become unmanageable on small ones. Here, text summarization is needed to reduce the size of documents to accommodate different display formats.

One approach to summarizing text is to extract sentences from a source text using a structural analysis technique. Structural analysis techniques employ the semantic structure of text to rank sentences for inclusion in a final summary. The structural summarization method is also well suited for producing summaries of varying sizes to accommodate a wide variety of display formats. However, the resulting summaries may include information that could be reasonably omitted or generalized without a significant loss of information content. Post processing to suppress some information is one effective method of reducing summary text size, although some loss of readability may result. Therefore, it is desirable to reduce the size of text summaries generated by structural analysis techniques while preserving readability and fidelity to the source text.

DETAILED DESCRIPTION

The invention is illustrated by way of example and not byway of limitation in the figures of the accompanying drawings in which like references indicate similar elements. It should be noted that references to "an" or "one" embodiment in this disclosure are not necessarily to the same embodiment, and such references mean at least one.

In one embodiment, a source text (e.g., written or spoken discourse) is processed by structural analysis techniques to create a structural summarization. The structural summarization is further summarized by compressing portions of it that are inclined to generalization. Natural language techniques can then be used to generate text corresponding to the compressed portions of the structural summarization. A final summary is then created based on the structural summarization and the generated text. In one embodiment, text generated by natural language techniques can be differentiated from other text in the final summary. In another embodiment, a means can be provided to allow a user to view the original source text underlying the generated text, such as for example by allowing the user to select the generated text on a display using an input device (e.g., a mouse, a stylus, a speech recognizer, a keyboard, a head or body motion recognizer, etc.).

Figure 8:
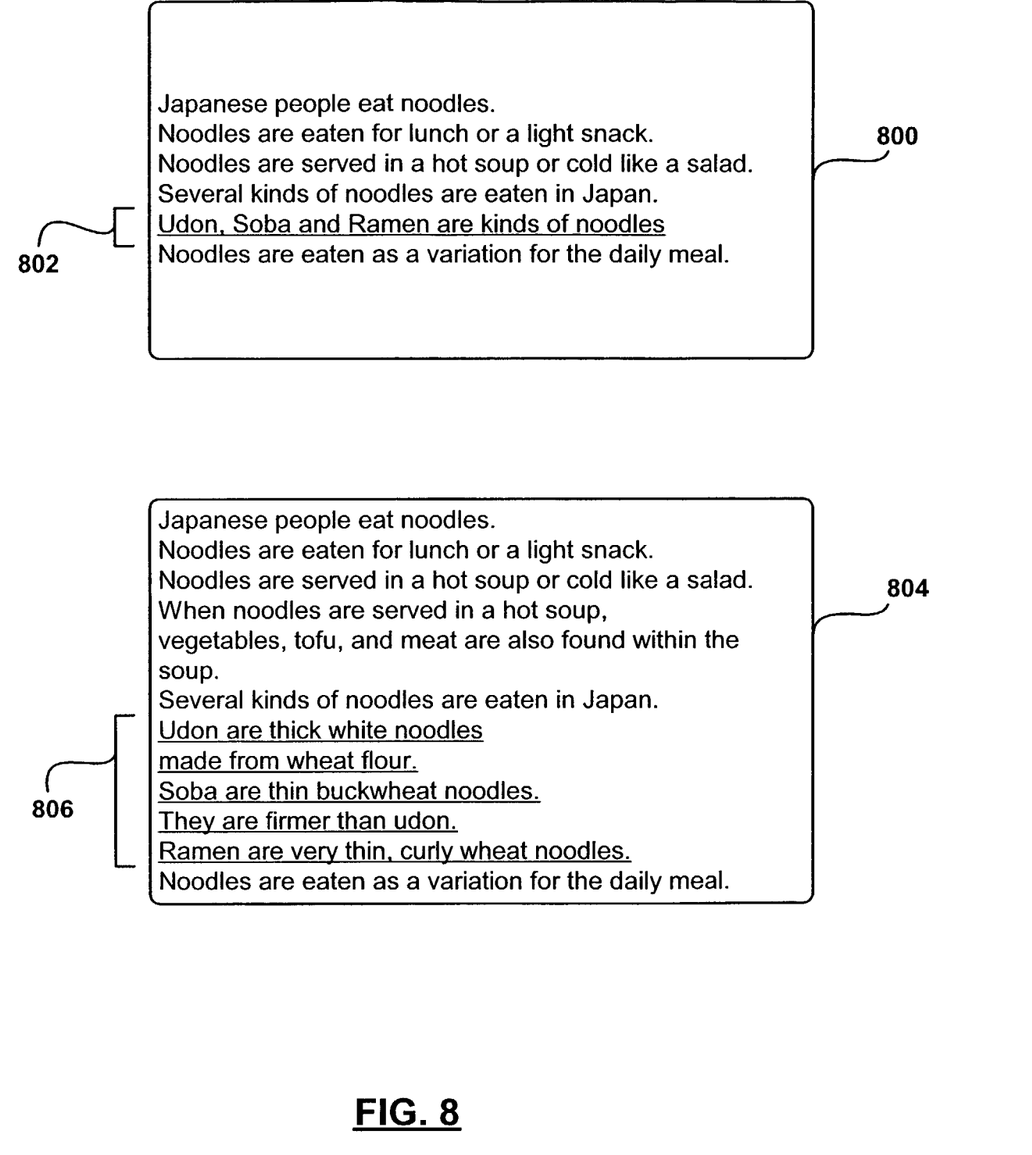
FIG. 8 is an exemplary graphical user interface in accordance with one embodiment.

FIG. 8 is an exemplary graphical user interface in accordance with one embodiment. In one embodiment, by way of illustration, a text summary 800 is displayed for a user wherein text that was manufactured through natural language techniques or other means can be highlighted 802. By way of a non limiting example, text highlighting can be accomplished through a number of means, such as by changing the color, typeface, size, emphasis or other attributes of the text. In another embodiment, text highlighting occurs when an input cursor is positioned over or in close proximity to the generated text. By selecting the highlighted text, the underlying text upon which the summarization was based is revealed as in 804. In one embodiment, the underlying text can also be highlighted to enhance readability 806, in which case the highlighting can be the same or different from that of the generated text. In another embodiment, the underlying text can appear in a separate portion of the display or a separate window. In yet another embodiment, the underlying text can be spoken through a speech synthesizer. In one embodiment, selecting the underlying text 806 causes it to be replaced by the natural language summarization 802. In this way, a user can toggle between the underlying text and its summarization.

Structural analysis of a source text represents the discourse in terms of semantic relationships or other grounds between units of text. Such relationships can be represented as a discourse tree (or tree), although it is appreciated that other data structures are within the scope and spirit of the present invention (e.g., stacks, arrays, lists, maps, etc.). The present invention is not limited to any particular theory of discourse. For example, discourse analysis theories that may be used in accordance with this invention include the Linguistic Discourse Model ("LDM"), Rhetorical Structure Theory ("RST"), Discourse Structures Theory, Structured Discourse Representation Theory, etc.

In one embodiment, the first step in structural analysis of a source text is to create a structural representation. This can be accomplished by segmenting the source text into discourse units ("DU's"). DU's are portions of text small enough for the particular structural analysis technique employed to extract semantic meaning from and thereby build a semantically correct structural representation of the source text. Automatic segmentation of text can be accomplished by statistical methods or by shallow or deep parsing techniques. Statistical methods of segmentation use machine learning techniques to tag words and then aggregate strings of tagged words into structures that learning algorithms expect to correspond to DU's. Shallow parsing methods use tagged words and knowledge of some simple linguistic structures to break sentences into clauses and phrases. Deep parsing methods use word tagging and extensive rules to produce detailed analyses of the relations obtaining among the words making up a sentence.

In one embodiment, once the source text is segmented into DU's (or as the source text is being segmented into DU's), a tree structured representation of the source text is created based on semantic relationships among DU's. The tree may be assembled, for example, by using symbolic parsing methods such as found in the Xerox Corp. (Stamford, Conn.) Linguistic Environment with Glue Semantics. Generally speaking, the tree embodies semantic relations in the source text, wherein some nodes in the tree represent DU's and others represent semantic relationships among the DU's. The source text can be completely reconstructed from the tree. Summarization is accomplished by removing selected nodes based on a particular ranking scheme. The resulting "pruned" tree thus embodies a summary (or structural summarization) of the text. The present invention further summarizes such a pruned tree by identifying semantic relationships that are susceptible to compression.

In one embodiment, compression involves deriving a generalization that summarizes a portion of a tree (or subtree) to create a compressed representation. When a summary of the original source text is generated based on the generalization, summary text is manufactured in one embodiment using natural language generation techniques. Such manufactured text is more concise than the source text.

In one embodiment, by way of illustration, compression is performed on subtrees representing coordination relationships. In one embodiment, a coordination relationship exists between DU's at the same level of discourse. In another embodiment, a coordination relationship expresses a non-elaborative relationship between DU's. A non-limiting example of coordination-type relationships includes items in a list, chapters in a book, a new topic of conversation following a previously concluded topic of conversation, etc. Any theory of discourse that relates information in a coherent text will undoubtedly express a coordination-type relationship, perhaps in a number of ways. Therefore, the embodiments described herein are not limited to a particular coordination-type relationship as embodied in LDM, RST, etc.

In a tree, such continuing activities (or coordinations) can be children of a non-terminal coordination node. For example, the DU's in source text (1) would all be direct children of a coordination node, whereas the DU's in source text (2) would not.

| (1) | (2) |
|---|---|
| (a) Alice likes him. | (a) Alice likes him. |
| (b) Laura does too. | (b) Alice has red hair. |
| (c) Sam likes him. | (c) Sam likes him. |

In source text (1), each DU (1)(a)-(1)(c) expresses an idea at the same level of discourse. However, in source text (2), DU (2)(b) elaborates on (2)(a) by providing additional information about Alice, but does not contribute to the level of discourse exhibited in (2)(a) and (2)(c). In the case of source text (2), (2)(a) and (2)(c) would be direct children of a coordination node, but (2)(b) would not.

In one embodiment, compression of coordinations is based on the well established notions of unification and generalization in computer science and mathematics. DU's are represented as first order terms, and generalization and unification are defined term-wise. Generally speaking, unification of a particular language can be defined as an ordering of the expressions of that language from most specific to most general. Another definition of unification is that given two expression, the expressions are "unified" if there is a substitution that makes them identical.

For example, let language L consist of a, b, c, d to range over constants, X, Y, Z, P, Q to range over variables, x, y, p, q to range over either, and symbols f, g, h, k to range over functions. Arbitrary expressions of language L are denoted by $\phi$ and $\psi$. Expression $\phi$ is considered more general than $\psi$ ($\psi$ is more specific than $\phi$) if there is a way of substituting values for variables in $\phi$ which transforms $\phi$ into $\psi$. For example, f (P, b, Q) is more general than f (a, b, Z), because we can substitute a for P and Z for Q.

Most Specific Generalization ($\phi \cup \psi$):

$\gamma$ is a Most Specific Generalization ("MSG") of $\phi$ and $\psi$ iff $\phi$ and $\psi$ are more specific than $\gamma$ and every $\gamma$ such that $\phi$ and $\psi$ are more specific than $\gamma$ is more general than (or equivalent to) $\gamma$. For example:

$$\text{spinach} \cup \text{beans} = \text{vegetables} \tag{3}$$

The following relations are also defined for MSG's:

$$X \cup a = a \cup Y = X \cup Y = Z \tag{4}$$

$$x(y) \cup p(q) = (x \cup p)(y \cup q) \tag{5}$$

For example, given the following statements in source text (6):

(a) John likes oranges.

(b) Mary likes pears. (6)

Source text (6) can be generalized in one embodiment as follows:

John likes oranges.$\cup$Mary likes pears.

LIKE (John, oranges)$\cup$LIKE (Mary, pears)

LIKE (John$\cup$Mary, oranges$\cup$pears)

LIKE (people, fruit) (7)

From this generalization, a summary sentence can be manufactured: People like some fruit. Another example:

$$f(X,c,a) = f(g(a,b),c,a) \cup f(d,c,a) \tag{8}$$

Most General Unifier ($\phi \cap \psi$):

$\gamma$ is a Most General Unification ("MGU") of $\phi$ and $\psi$ iff $\phi$ and $\psi$ are more general than $\gamma$ and every $\gamma$ such that $\phi$ and $\psi$ are more general than $\gamma$ is more specific than (or equivalent to) $\gamma$. Since its conception as a method for automatic proof systems, unification algorithms have been used for a large number of applications and domains (e.g., the Prolog programming language). For example:

Alice likes him.$\cap$Laura does too.

LIKE (Alice, him)$\cap$LIKE (Laura, X)

LIKE ([Alice+Laura], him) (9)

Another example:

$$f(a,b,a) = f(X,b,X) \cap f(a,Y,Z) \tag{10}$$

In one embodiment, ambiguities among coordinations can be resolved before performing compression. For example, in source text (1) above, "does" in (1)(b) inferentially refers to "likes" in (1)(a). In (1)(c), "him" inferentially refers to the same "him" as in (1)(a). By identifying and resolving parallel relationships such as these, a generalization can be developed that encompasses the source text (e.g., "People like him"). In one embodiment, such ambiguities can be resolved through a process of default unification, which is based on assumptions regarding relationships between DU's. The definition of default unification follows from the definition of default generalization:

Default Generalization ($\phi \not\cup \psi$):

$\gamma$ is a Most Specific Common Denominator (MSCD) of $\phi$ relative to $\psi$ iff $\gamma$ is more general than $\phi$ and unifies with $\psi$ and every $\gamma$ that is more specific to $\gamma$ and is more general than $\phi$ and unifies with $\psi$ is equivalent to $\gamma$. That is, the MSCD (or default generalization) of two expressions denotes what the two expressions have in common and may be thought of unifying those atomic terms that unify and generalizing the others. For example:

$$f(a,Z) = f(a,b) \not\cup g(X,c) \tag{11}$$

Default Unification ($\phi >> \psi$):

The definition of default unification is based upon the definition of MSCD. $\gamma$ is a default unification of $\phi$ with $\psi$, iff $\gamma$ is a MGU of ($\phi \not\cup \psi$) and $\psi$. For example:

$$f(a,b) >> g(X,c)$$

$$= [f(a,b) \not\cup g(X,c)] \cap g(X,c)$$

$$= f(a,Z) \cap g(X,c)$$

$$= f(a,c). \tag{12}$$

In one embodiment, the compressed representation can be fed into a natural language generation ("NLG") system to manufacture text for the final summary. NLG systems are designed to produce coherent natural language text. Traditionally, NLG systems can be comprised of a text planning module that decides what to say and creates a discourse plan that specifies how the information should be deployed in the text. In one embodiment, this may be schema based or based on coherence relations that exist between individual DU's. Schemata or planning principles about coherence relations reflect notions of the text structure of a given genre, often further sub-categorized to reflect the expected structure of a text of that type operating in a specific domain.

After a discourse plan is decided upon based on the compressed representation, a text template is constructed and a sentence planning module is used to determine how best to deploy sentences in the text to realize the plan determined by the text planning module. The output of this process then provides instruction to a sentence generator consisting of a natural language grammar and a lexicon to produce well-formed utterances that express the desired content. In one embodiment, these grammars may be bi-directional, such as the Xerox Corp. (Stamford, Conn.) Linguistic Environment. In another embodiment, they may be modified for generation such as the Functional Unification Grammar used in the Systemic Unification Realization Grammar of English.

When NLG is used to produce summaries, the issue of determining which information from the source text to include in the summary text must be addressed. In one embodiment, a text template is created and filled in with information extracted from the source text using statistical or finite state methods. In another embodiment, statistical methods common to statistical sentence extraction summarization are used to select information that is then passed on to the generalization module. In yet another embodiment, the compressed representation is sent directly to a sentence generator which produces a grammatical natural language sentence containing the information that the coordination has in common if that information is sufficient to form the basis of a well formed sentence. It is appreciated that any NLG system designed to produce coherent natural language text can be used with the embodiments described herein.

Figure 1:
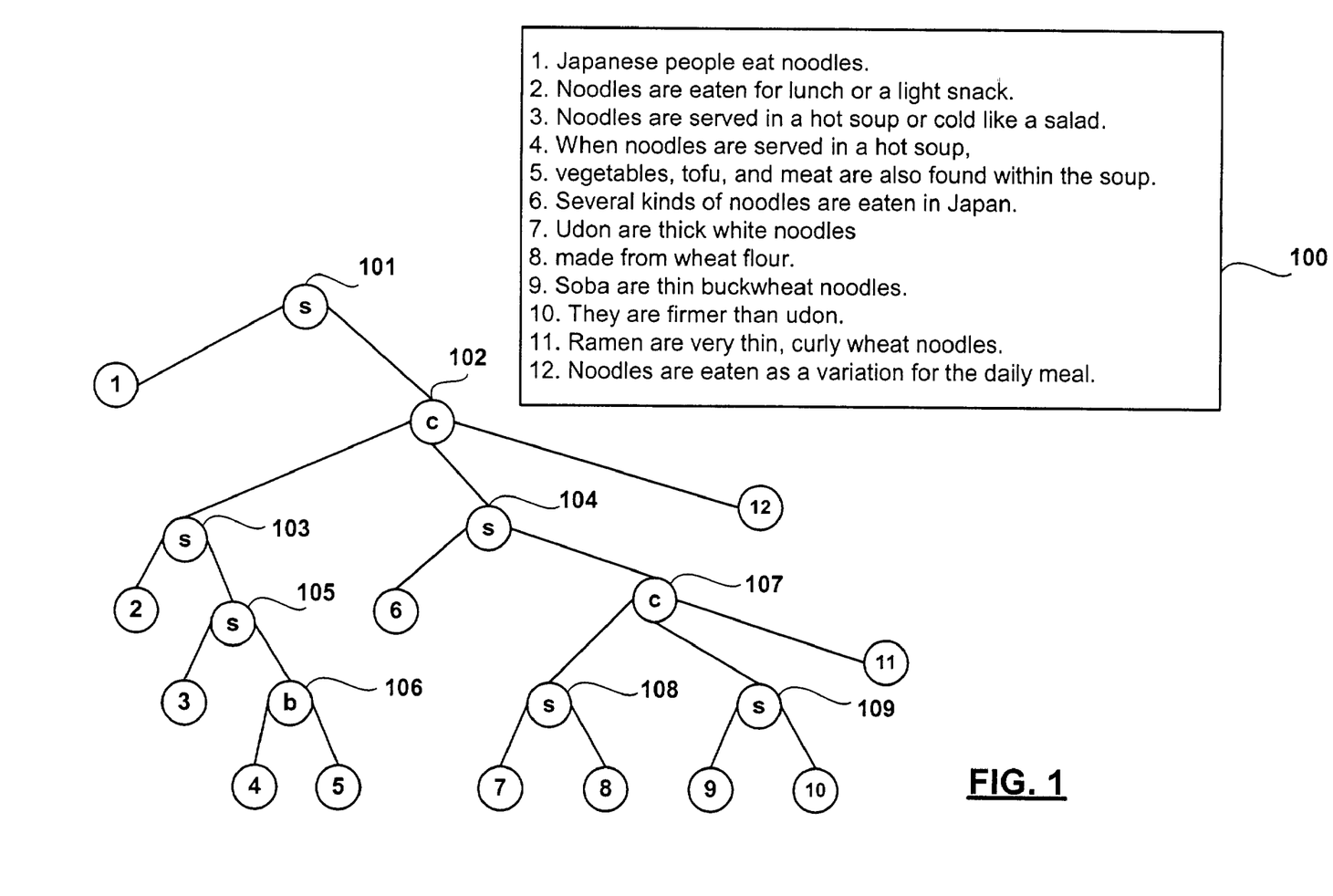
FIG. 1 is an exemplary tree in accordance with one embodiment.

FIG. 1 is an exemplary tree in accordance with one embodiment. The tree results from the LDM representation of three main relationships in a source text: coordinations, subordinations and binaries. Coordination subtrees (C nodes) express a symmetric relationship among children, where a new DU continues the development of a previous DU. Subordination subtrees (S nodes) express elaborations on a point just made, elaborations, digressions, asides, appositives, etc., where a new DU provides more information about a previous DU. Binary subtrees (B nodes) express ad hoc relationships, such as if/then, question/answer, and other distinguished logical or rhetorical relations. Despite their name, binary nodes may have more than two children (hence, they are n-ary).

The tree in FIG. 1 represents source text 100. Each numbered sentence in the source text 100 represents a DU. The tree has as its root a subordination node 101. There are also leaf nodes 1-12 corresponding to DU's in source text 100, subordinations 101, 103, 104, 105, 108 and 109, coordinations 102 and 107, and binary 106.

For example, coordination 107 has three children: subordinations 108 and 109, and leaf node 11. In one embodiment, interpretation of a subordinate is the same as the interpretation of its left daughter—the right daughter is ignored. Thus, coordination 107 represents a coordination relationship among leaf nodes 7, 9 and 11:
   Udon are thick white noodles
   Soba are thin buckwheat noodles.
   Ramen are very thin, curly wheat noodles.

Subordination 108 has two children: leaf node 7 and leaf node 8. Node 8 elaborates or expands on the information in node 7:
   Udon are thick white noodles made from wheat flour.

Binary 106 expresses a logical relationship between its two children, leaf nodes 4 and 5:
   When noodles are served in a hot soup, vegetables, tofu, and meat are also found within the soup.

Figure 2:
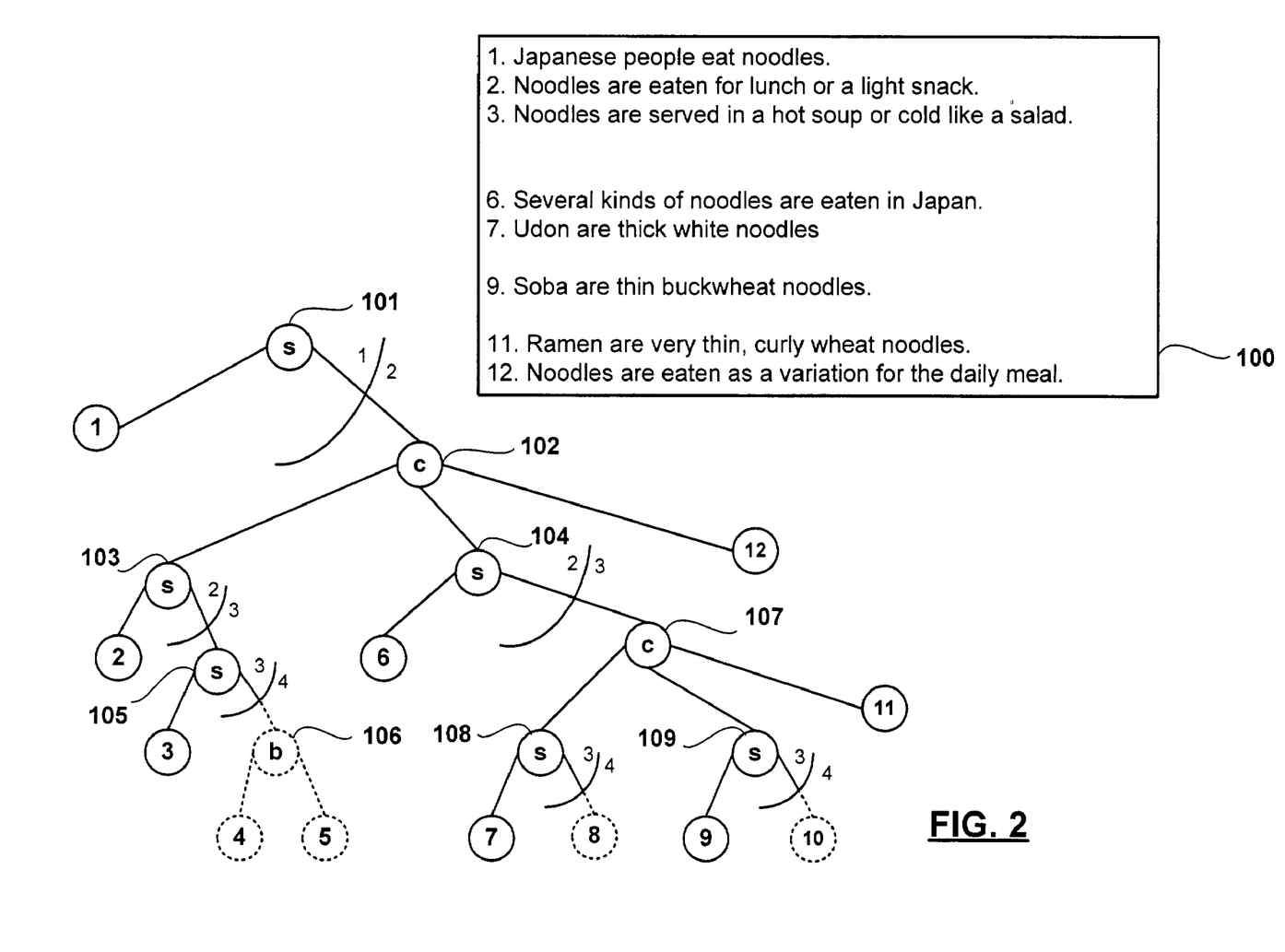
FIG. 2 is an exemplary tree pruned to depth three in accordance with one embodiment.

FIG. 2 is an exemplary tree pruned to depth three in accordance with one embodiment. Choosing which nodes to include in a summary requires that the nodes in the tree be ranked according to a ranking algorithm. Only nodes meeting a specific rank criteria will be included in the summary. Other nodes will effectively be "pruned" from the tree and thus excluded from the summary.

In one embodiment, ranking is accomplished by scoring DU's based on their importance to the coherence of the entire text. In another embodiment, ranking is accomplished by measuring the depth of a node using the following formula: the depth of a node N is defined as the number of right edges of S nodes plus one between N and the root. Pruning removes all nodes having a depth greater than a specified depth. In FIG. 2, for example, leaf node 1 has a depth of one, coordination 102 has a depth of two, and leaf node 10 has a depth of four Since FIG. 2 illustrates a tree of depth three, all nodes having a depth greater than three are excluded from the summary. This is indicated as deleted DU's in source text 100.

Figure 3:
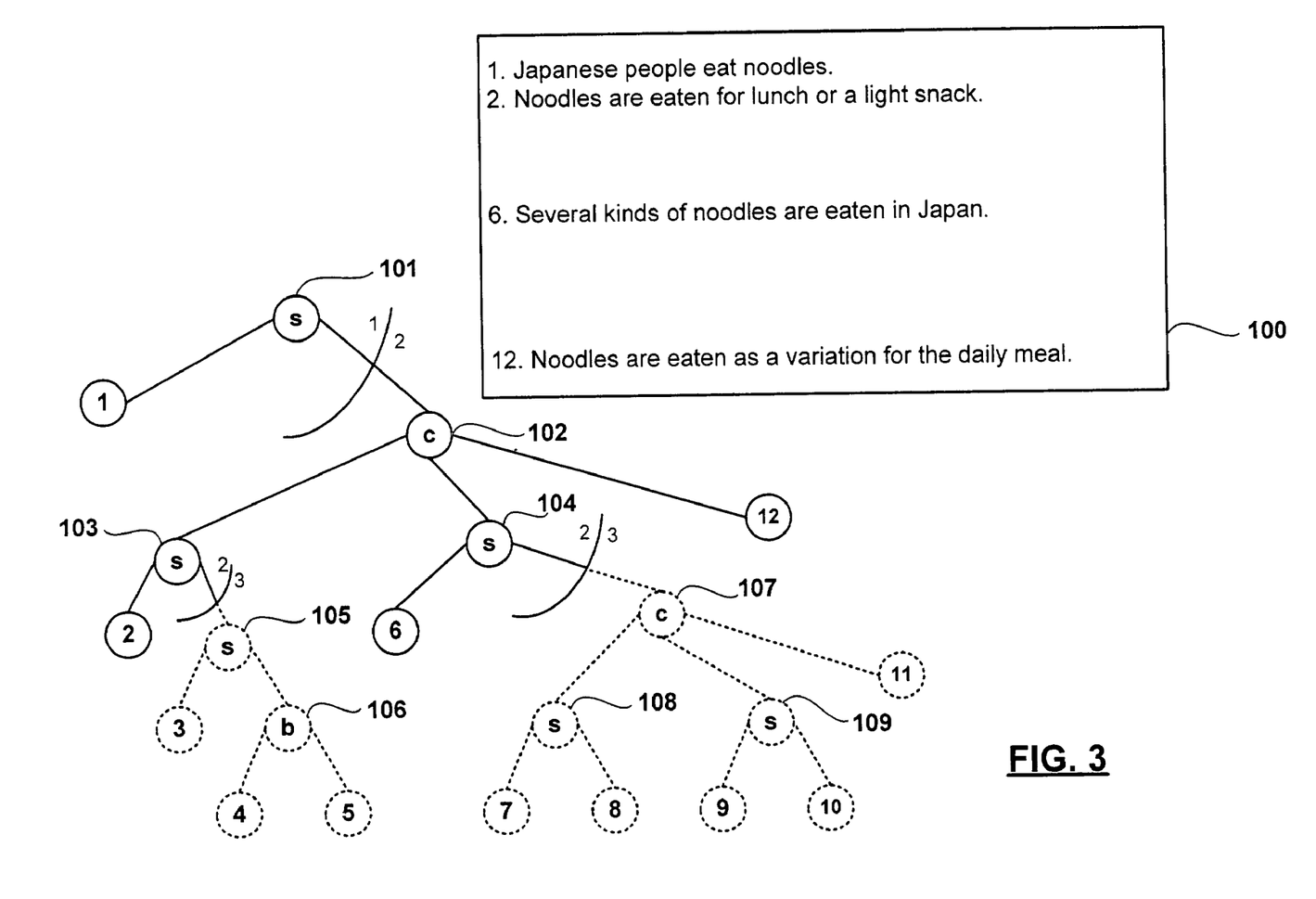
FIG. 3 is an exemplary tree of pruned to depth two in accordance with one embodiment.

FIG. 3 is an exemplary tree of pruned to depth two in accordance with one embodiment. All nodes having a depth greater than two are excluded from the summary. Subordination 105 (and its subtrees), and coordination 107 (and its subtrees) are pruned.

Figure 4:
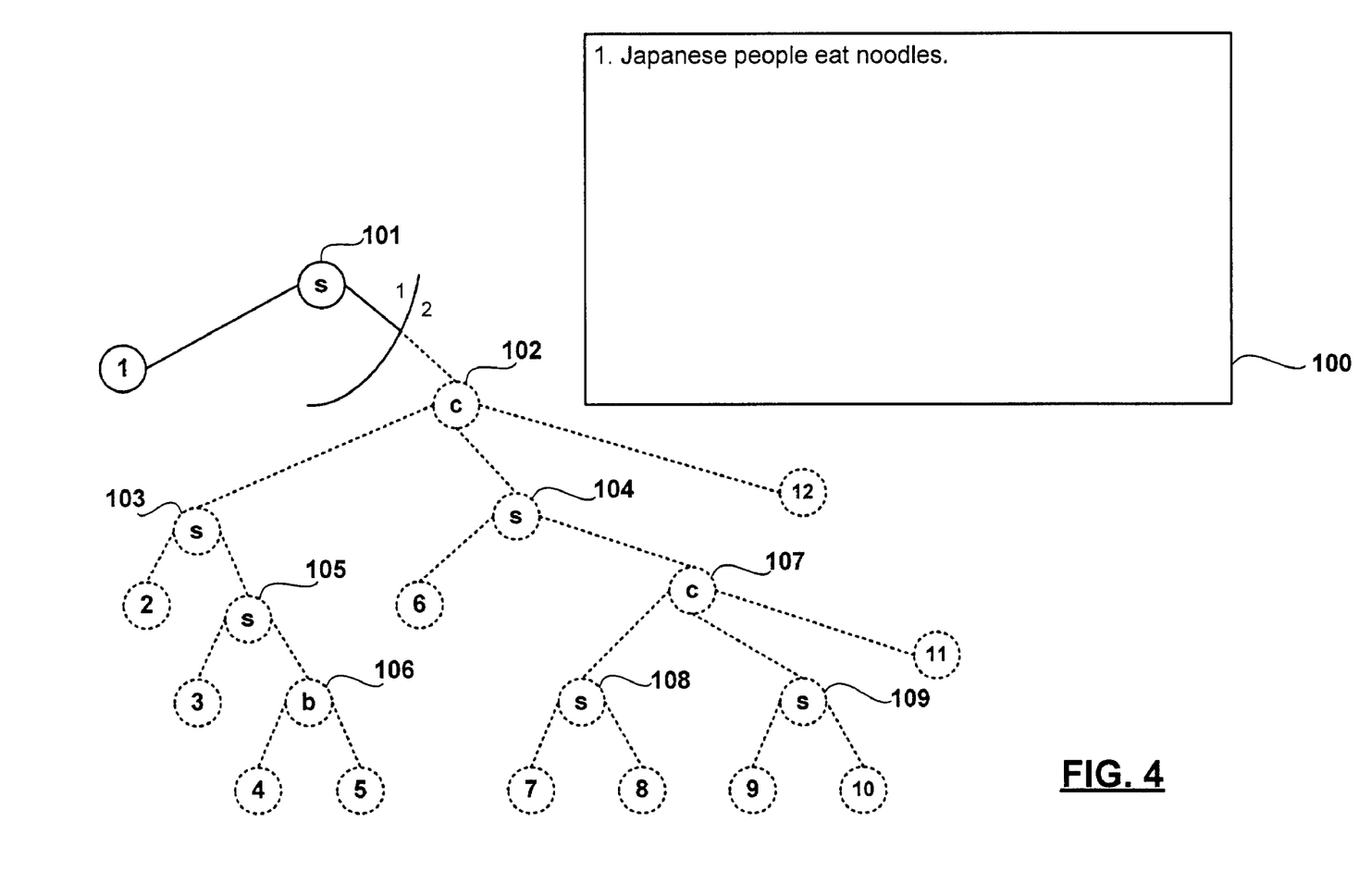
FIG. 4 is an exemplary tree pruned to depth one in accordance with one embodiment.

FIG. 4 is an exemplary tree pruned to depth one in accordance with one embodiment. Coordination 102 and all of its subtrees are pruned.

Figure 5:
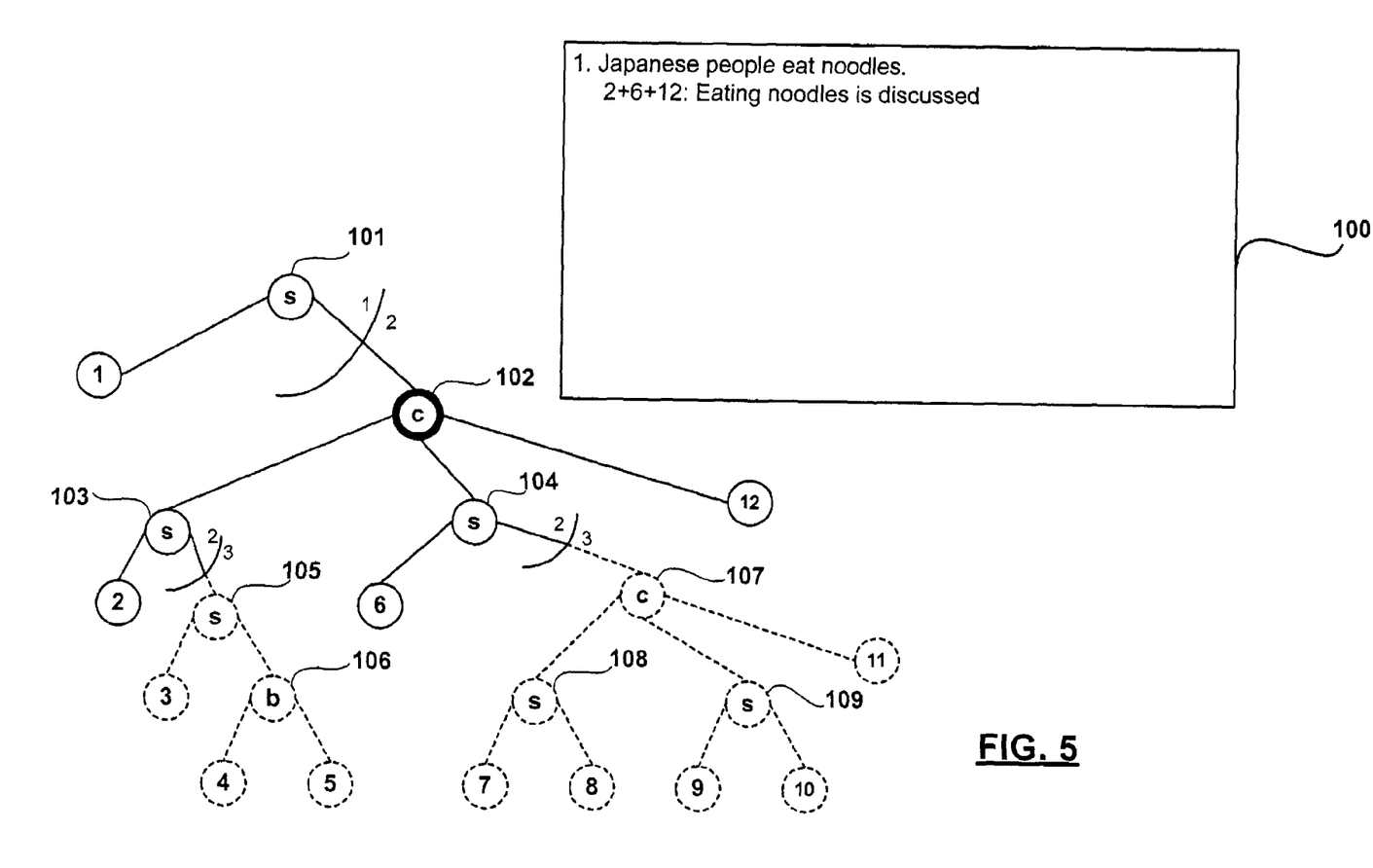
FIG. 5 is an exemplary compressed tree of depth two in accordance with one embodiment.

FIG. 5 is an exemplary compressed tree of depth two in accordance with one embodiment. The tree is first pruned at the specified depth of two. Then, coordinations that are susceptible to compression are generalized. In one embodiment, a coordination is susceptible to compression if it is directly ascertainable. That is, if the coordination has only leaf nodes for children (or subordinations having one child). In another embodiment, a coordination is susceptible to compression if its subtrees can be compressed (e.g., through default unification or other means). In FIG. 5, coordination 102 is susceptible to compression since its children comprise subordination nodes (103 and 104) that have only one child (after pruning) and a leaf node 12. In one embodiment, by using default unification for example, the pruned coordination:
   Noodles are eaten for lunch or a light snack
   Several kinds of noodles are eaten in Japan
   Noodles are eaten as a variation from the daily meal
can be compressed to:
   Eating noodles is discussed.

Figure 6:
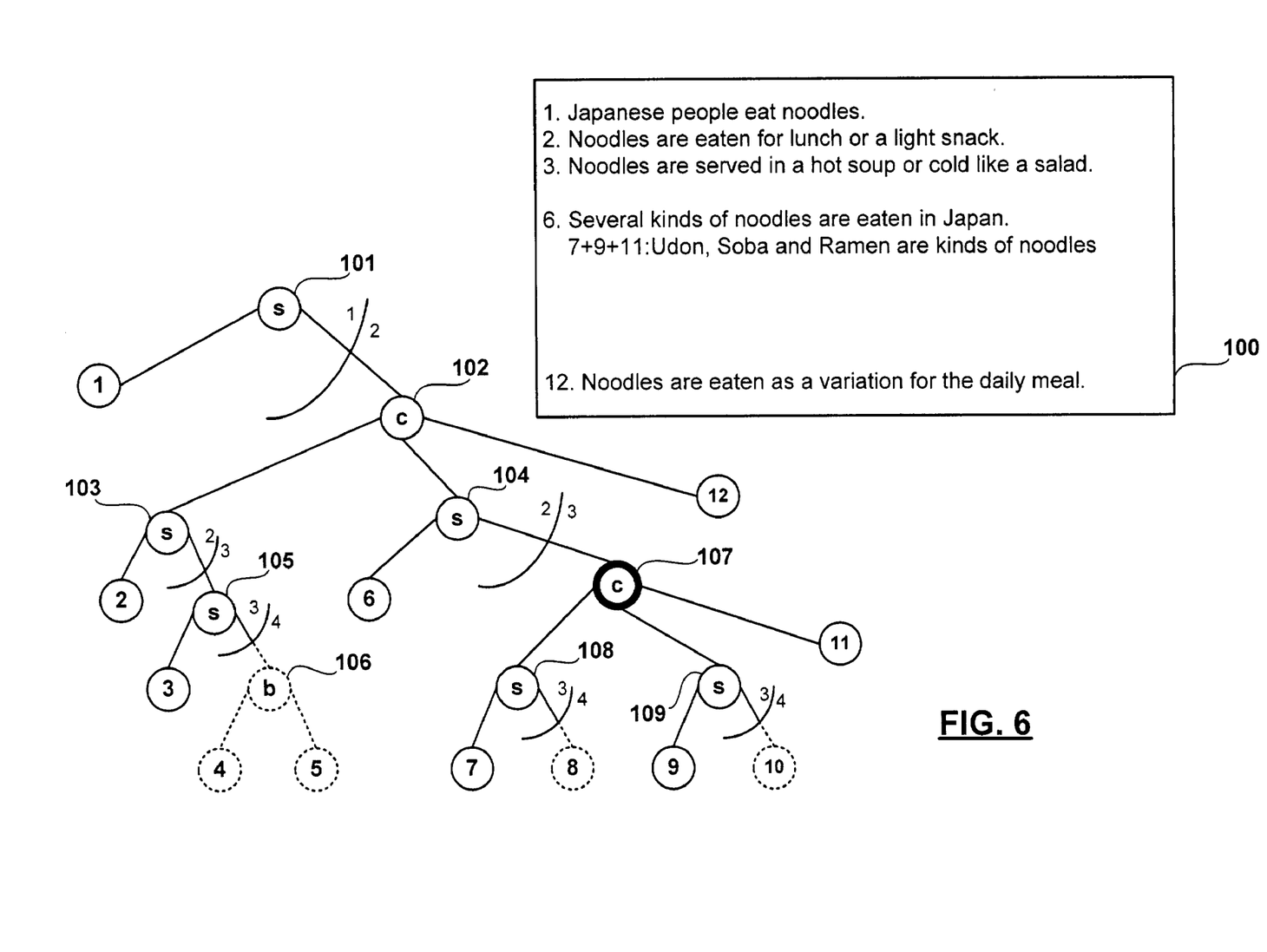
FIG. 6 is an exemplary compressed tree of depth three in accordance with one embodiment.

FIG. 6 is an exemplary compressed tree of depth three in accordance with one embodiment. In one embodiment for example, pruned coordination 107:
   Udon are thick white noodles
   Soba are thin buckwheat noodles
   Ramen are very thin, curly wheat noodles
can be compressed to:
   Udon, Soba and Ramen are kinds of noodles.

In another embodiment, compression can used in the context of RST. Trees formed under RST have a large variety of possible node types which are designed to provide an inventory of ways that one linguistic unit may be "coherent" with another. RST has an unlimited number of relations although, in practice, somewhere between 20 and 60 relations are used. In addition, some relations, those associated by a Nucleus and Satellite arc, connect unequal constituents. The Nucleus constituent of a relation is considered more essential to the text than the Satellite constituent. In RST, a Nucleus constituent may either precede or follow its Satellite in the linear order of the text. In the LDM, the Nucleus/Satellite relation is reflected in the Subordination relation. However, under the LDM, the Nucleus constituent will always precede the Satellite constituent that elaborates on it.

Therefore, while a few RST relations map directly onto LDM relations because they critically involve linear order or because they are essentially logical rather than argumentative relations, mappings between RST and LDM for the many RST relations involving a Nucleus and Satellite will depend on the linear order of constituents on the surface structure of the text.

To illustrate, a Justification for an action normally follows the description of the action for which justification is called for. The LDM would thus identify an Subordination relation to hold between the action and the justification, since the justification serves to elaborate on the action. However, it is possible to state the Justification first and then state the justified circumstance. In this case, the Justification constituent may be Coordinated to the constituents describing the justified circumstance since the justified circumstance is at the same level of discourse as the Justification, rather than serving as an elaboration.

In one embodiment, RST relationships can be mapped to LDM relationships as follows:

| LDM Relationship | RST Relationship |
| --- | --- |
| Coordinations | List |
| | Sequence |
| | Concession—BUT |
| | Otherwise (anti conditional)—OR |
| | Restatement |
| | Solutionhood |
| | Summary |
| | Volitional or non-volitional Cause |
| | Volitional or non-volitional Result |
| Binaries | Joint |
| | Contrast |
| | Antithesis |
| Subordination | Elaboration |
| Subordinations if Nucleus Precedes Satellite in text- otherwise Coordinations | Condition |
| | Enablement |
| | Preparation |
| | Motivation |
| | Purpose |
| | Justification |
| | Background |
| | Circumstance |
| | Evidence |
| | Interpretation |
| | Evaluation |

An RST summarization algorithm is applied to delete material from a source text deemed less important to the content according to the score assigned by the RST text structure algorithm. This will delete a number of leaf and non-terminal nodes. Then, for every node that has an RST label that can be mapped into a coordination structure and has only leaf nodes as daughters, those leaf nodes can be compressed to generate a summary of those nodes as described by the embodiments herein.

Figure 7:
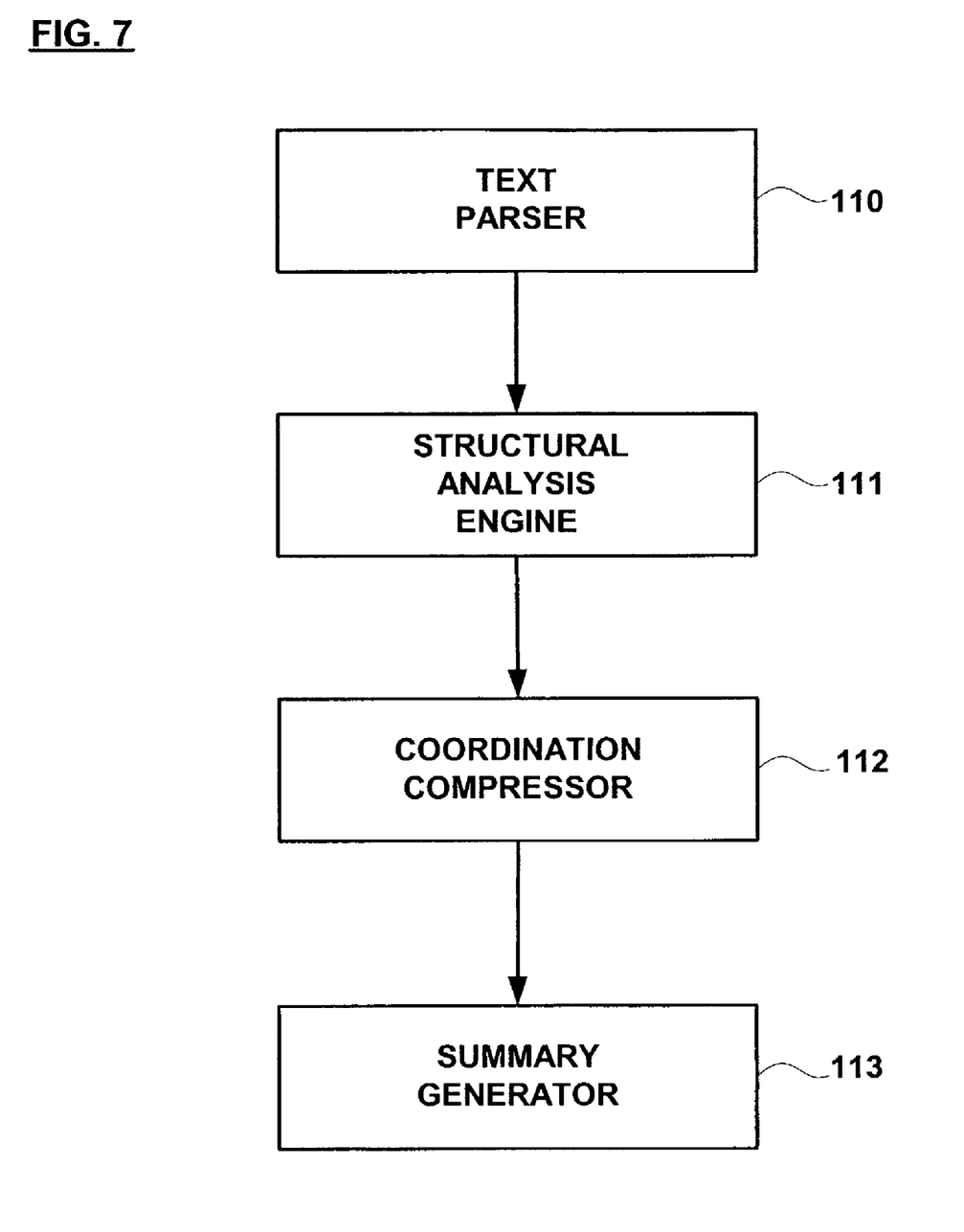
FIG. 7 is a block diagram of an exemplary system in accordance with one embodiment.

FIG. 7 is a block diagram of an exemplary system in accordance with one embodiment. Such a system could be incorporated into a web browser, word processor or other program designed to view or manipulate documents, for example. In one embodiment, text parser 110 receives as input a source text to be summarized. For example, the source text can be a digital document or can be speech that has been converted to text. The source text can be stored in a computer memory, a computer file, a cache, or be transmitted via a computer network (not shown). Working in conjunction with structural analysis engine 111, text parser 110 segments the source text into DU's in accordance to a particular theory of discourse (e.g., LDM, RST, etc.). In another embodiment, text parser 110 is integrated with structural analysis engine 111. Structural analysis engine 111 builds a structural representation (e.g., a discourse tree) of the source text based on the semantic relationships between DU's. In another embodiment, structural analysis engine 111 also performs structural summarization of the structural representation by removing DU's deemed unimportant to the summary. This can be accomplished by ranking nodes according to a ranking algorithm, and then removing nodes having a low rank. Next, coordination compressor 112 compresses select coordination relationships in the structural representation of the source text. Coordination relationships can be compressed by generalizing their DU's. In one embodiment, a coordination relationship is generalized through unification and generalization. In another embodiment, a coordination relationship is generalized by default unification. Finally, summary generator 113 generates a textual summary of the source text based on the structural summarization as compressed by coordination compressor 112. In one embodiment, summary generator 113 can use NLG techniques to manufacture text for compressed coordinations.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method of summarizing source text, comprising:
ranking two or more nodes in a discourse tree, wherein the ranking is based on the depth of the node, wherein the depth of a node (N) is calculated from the number of subordinated edges of subordination subtree nodes plus one between N and the root, and including removing all nodes having a depth greater than a specified depth;
performing structural summarization based on the ranking of nodes of the source text; and
compressing at least one relationship in the structural summarization.

2. The method of claim 1 wherein:
the structural summarization is based on one of Linguistic Discourse Model, Rhetorical Structure Theory, Discourse Structures Theory, and Structured Discourse Representation Theory.

3. The method of claim 1 wherein:
the source text is represented as a discourse structure comprised of one or more discourse units.

4. The method of claim 3 wherein:
compressing the at least one relationship is based on default unification, wherein default unification involves ordering of discourse units from most specific to most general.

5. The method of claim 1 wherein:
the at least one relationship expresses a coordination relationship between a plurality of discourse units.

6. The method of claim 1, further comprising:
generating a text summary based on the structural summarization and the at least one compressed relationship.

7. The method of claim 6 wherein:
portions of the generated text summary that are based on the at least one compressed relationship are distinguished from other portions of the generated text summary.

8. The method of claim 6 wherein:
the source text underlying the at least one compressed relationship in the generated text summary can be accessed.

9. The method of claim 1 wherein:
compressing the at least one relationship is based on unification, wherein the relationships are unified if there is a substitution that makes them identical.

10. The method of claim 1 wherein:
compressing the at least one relationship is based on default unification, wherein default unification involves ordering of discourse units from most specific to most general.

11. The method of claim 1 wherein:
the source text underlying the at least one compressed relationship in the generated text summary can be accessed.

12. A method of summarizing source text, comprising:
applying default unification to at least one coordination-type relationship in a structural representation of the source text to create at least one compressed representation, wherein default unification involves ordering of expressions of the text from most specific to most general; and
performing structural summarization of the source text, the structural summarization to be accomplished by ranking two or more nodes in a discourse tree, wherein the ranking is based on the depth of the node, wherein the depth of a node (N) is calculated from the number of subordinated edges of subordination subtree nodes plus one between N and the root, and including removing all nodes having a depth greater than a specified depth.

13. The method of claim 12 wherein:
a coordination-type relationship expresses a symmetric relationship between a plurality of discourse units.

14. The method of claim 12 wherein:
the structural representation is based on one of Linguistic Discourse Model, Rhetorical Structure Theory, Discourse Structures Theory, and Structured Discourse Representation Theory.

15. The method of claim 12 wherein:
the source text is represented as a discourse structure comprised of one or more discourse units.

16. The method of claim 12, further comprising:
generating a text summary based on the structural representation and the at least one compressed representation.

17. The method of claim 16 wherein:
portions of the generated text summary that are based on the at least one compressed representation are distinguished from other portions of the generated text summary.

18. The method of claim 16 wherein:
the source text underlying the at least one compressed representation in the generated text summary can be accessed.

19. The method of claim 16 wherein:
generating a text summary based on the at least one compressed representation uses natural language generation.

20. The method of claim 12 wherein:
the at least one relationship is directly ascertainable.

21. The method of claim 12 wherein:
the at least one relationship includes at least one other relationship that can be compressed.

22. A method for selecting coordination relationships for compression in a discourse, the method comprising:
automatically segmenting the discourse into units, wherein the segmenting is based on a technique selected from the group consisting of statistical methods, shallow parsing and deep parsing, wherein the discourse can be represented by two or more nodes in a discourse tree;
ranking two or more discourse units, wherein the ranking is based on the depth of the node, wherein the depth of a node (N) is calculated from the number of subordinated edges of subordination subtree nodes plus one between N and the root;
pruning to remove all nodes having a depth greater than a specified depth;
structurally summarizing based on the ranking of the discourse units, wherein the discourse units segments are small enough for the structural summarization to extract semantic meaning from the discourse; and
selecting at least one coordination relationship in the representation, wherein the at least one coordination relationship is susceptible to compression.

23. The method of claim 22 wherein:
a coordination relationship is susceptible to compression if it is directly ascertainable.

24. The method of claim 22 wherein:
a coordination relationship is susceptible to compression if it includes at least one other relationship that is susceptible to compression.

25. A system for summarizing source text comprising:
a means for ranking two or more nodes in a discourse tree, wherein the ranking is based on the depth of the node, wherein the depth of a node (N) is calculated from the number of subordinated edges of subordination subtree nodes plus one between N and the root;
a means for performing structural summarization on the ranking of nodes of the source text, including means for pruning to remove all nodes having a depth greater than a specified depth;
a means for compressing at least one coordination relationship in the structural summarization; and
a means for generating a text summary based on the structural summarization and the at least one compressed coordination relationship, wherein by selecting the text summary the source text underlying the at least one compressed relationship can be accessed.

26. The system of claim 25 further comprising:
a means for generating a text summary.

27. The system of claim 26 wherein:
the means for generating a text summary includes a natural language generator.

28. The method of claim 26 wherein:
portions of the generated text summary that are based on the at least one compressed relationship are distinguished from other portions of the generated text summary.

29. A machine readable medium having instructions stored thereon to generate a text summary that when executed by a processor cause a system to:
represent a source text as discourse units;
generate a discourse tree based on the discourse units;
rank nodes in the discourse tree, wherein the ranking is based on the depth of the node, wherein the depth of a node (N) is calculated from the number of subordinated edges of subordination subtree nodes plus one between N and the root;
prune to remove all nodes having a depth greater than a specified depth;
perform structural summarization based on the pruned ranking of the discourse units;
compress at least one relationship in the structural summarization; and generate a text summary based on the structural summarization and the at least one compressed relationship, wherein by selecting the text summary the source text underlying the at least one compressed relationship can be accessed.

30. The machine readable medium of claim 29 wherein: the structural summarization is based on one of Linguistic Discourse Model, Rhetorical Structure Theory, Discourse Structures Theory, and Structured Discourse Representation Theory.

31. The machine readable medium of claim 29 wherein: the source text is represented as a discourse structure comprised of one or more discourse units.

32. The machine readable medium of claim 31 wherein: the at least one relationship expresses a coordination-type relationship between a plurality of discourse units.

33. The machine readable medium of claim 29 wherein: portions of the generated text summary that are based on the at least one compressed relationship are distinguished from other portions of the generated text summary.

34. The machine readable medium of claim 29 wherein: compressing the at least one relationship is based on default unification.

35. The machine readable medium of claim 29 wherein: the at least one relationship is directly ascertainable.

36. The machine readable medium of claim 29 wherein: the at least one relationship includes at least one other relationship that can be compressed.

* * * * *